United States Patent [19]
Byrne

[11] Patent Number: 5,584,140
[45] Date of Patent: Dec. 17, 1996

[54] ROOTING METHOD FOR VEGETATIVE PLANT PROPAGATION OF HARD-TO-ROOT PLANTS

[76] Inventor: Michael Byrne, 25197 72nd Ave., Lawton, Mich. 49065

[21] Appl. No.: 589,098

[22] Filed: Jan. 23, 1996

Related U.S. Application Data

[63] Continuation-in-part of Ser. No. 416,060, Apr. 4, 1995.
[51] Int. Cl.⁶ .............................. A01G 7/00; A01G 23/02
[52] U.S. Cl. ........................................... 47/58; 47/DIG. 3
[58] Field of Search .................... 47/58, 5.5, DIG. 3, 47/59, 60, 64

[56] References Cited

U.S. PATENT DOCUMENTS

| | | | |
|---|---|---|---|
| 2,431,890 | 12/1947 | Raines | 47/58 |
| 2,816,825 | 12/1957 | Schmitz | 71/1 |
| 2,891,355 | 6/1959 | Nelson | 47/58 |
| 2,988,441 | 6/1961 | Pruitt | 71/27 |
| 3,831,317 | 8/1974 | Porte | 47/58 |
| 3,835,584 | 9/1974 | Shimazu | 47/77 |
| 3,961,445 | 6/1976 | Rack | 47/77 |
| 3,973,355 | 8/1976 | McKenzie | 47/56 |
| 4,012,866 | 3/1977 | Brokaw | 47/6 |
| 4,550,528 | 11/1985 | Mehra-Palta et al. | 47/58 |
| 4,569,914 | 2/1986 | Molnar et al. | 47/58 X |
| 4,612,725 | 9/1986 | Driver | 47/58 |
| 4,885,868 | 12/1989 | Maynard et al. | 47/58 |

FOREIGN PATENT DOCUMENTS

| | | | |
|---|---|---|---|
| 76678 | 6/1948 | Czechoslovakia | 47/5.5 |
| 1255080 | 9/1986 | U.S.S.R. | 47/DIG. 3 |
| 9115110 | 10/1991 | WIPO | 47/DIG. 3 |

OTHER PUBLICATIONS

Hartmann, H. T., et al. "Hotbeds"; Methods of Application (through) Care of Cuttings During Rooting; Layering *Plant Propagation* (2nd Ed.) 1968, Prentice–Hall Inc., Englewood, N.J., pp. 22–24, 306–321 and 481–496.

*Primary Examiner*—James R. Feyrer
*Attorney, Agent, or Firm*—Flynn, Thiel, Boutell & Tanis, P.C.

[57] ABSTRACT

A method of vegetative propagation which comprises (a) developing etiolated shoots on stock plants by immersing a stock plant horizontally in a flat or bed that contains a growing medium; (b) removing said shoots after they have reached a semi-hardwood state; (c) placing the shoots in a high moisture environment and leaving therein until roots adequate for planting have developed; (d) removing the shoots from the high moisture environment; and (e) planting the shoots for growth into plants.

17 Claims, 2 Drawing Sheets

ROOTING METHOD FOR VEGETATIVE PLANT PROPAGATION OF HARD-TO-ROOT PLANTS

The present application is a continuation-in-part of my prior file, copending application Ser. No. 08/416 060, filed Apr. 4, 1995, now pending.

This invention relates to plant propagation and more particularly to a method for rooting cuttings of hard-to-root plants by use of stem etiolation.

BACKGROUND OF THE INVENTION AND PRIOR ART

Plants that have been difficult or impossible to root from cuttings are generally propagated by a number of methods that include air-layering or marcotts; layering in stool beds; girdling and/or banding several weeks before taking cuttings and stem etiolation. All of these techniques require hand labor on each individual plant being produced.

Stem etiolation involves forcing new shoot growth under conditions of heavy shade or total darkness and then using this growth as the cutting propagule. Reid, O. "The Propagation of Camphor By Stem Cuttings", Trans. Bot. Soc. Edin. 28:184–188 (1923). Gardener, F. E., "Etiolation As A Method of Rooting Apple Variety Stem Cuttings", Proc. Am. Sco. Hort. Sci. 34:323–329 (1936). The use of etiolation both alone and in conjunction with banding is discussed extensively in U.S. Pat. No. 4,885,868.

In trench layering, vegetatively propagated dormant plants of the desired variety are either planted out-of-doors horizontally under the soil, or planted vertically out-of-doors. If planted vertically, its branches are bent to a horizontal position and covered with soil. In both of these situations, the buds begin to grow in the spring, and the shoots grow up through the soil. These shoots have tops which grow in the air and light providing the rest of the plant with carbohydrates; and have bases which become etiolated and are therefore more inclined to root. The shoots are left in place to root, and are not harvested until the fall or the spring of the following year. Although they may also be treated with a rooting hormone, they are not cut and placed in a mist bench. Their rooting rates are therefore not as high as experienced in the method of this invention, and since shoots are not removed as they are produced, some of the potentially harvestable shoots never form because the initiation of bud growth is inhibited by the growing shoots. Therefore, the number of harvested shoots is also lower than in the claimed method. Another difference between the two methods is that trench layering is performed out-of-doors, while the claimed method is performed in a greenhouse. The conditions during the plants' growth can therefore be much better controlled in the method of this invention.

Air layering is performed on a stock plant of the desired variety, on a branch in the air, thus resulting in its name. A portion of the branch is "girdled" completely around its circumference at a point just below the section to be layered. Then the section of branch immediately above the girdle (away from the trunk) is usually treated with a rooting hormone. This section is next covered with a material capable of holding water, such as sphagnum moss, and last is wrapped with a material which is impenetrable by both water and light such as tar-coated paper or aluminum foil. The girdle allows water to be transported upward from the roots to the part of the branch above the cut, but it stops the transport of carbohydrates and rooting hormones downward past the cut. These chemicals therefore accumulate just above the cut and promote rooting. The wrapping material holds in water to keep the branch and newly forming roots hydrated, but it also etiolates the branch, and thus increases the rooting potential of this plant part.

Descriptions of the trench and air layering techniques are known in the art of horticulture, Hartmann, H. G. et al, *Plant Propagation*: Principles and Practice, Prentice Hall: Fifth Edition (1990).

Banding, described in U.S. Pat. No. 4,885,868, is a technique similar to air layering. In this procedure, a stock plant is grown in the dark so that the emerging shoots are etiolated. A band of light-excluding material is wrapped around the bases of the growing shoots, and the plant is then placed in the light. The uncovered portions of the shoots then develop chlorophyll and thus become unetiolated, while the covered portions stay etiolated. Thus, carbohydrates are supplied for plant growth while producing shoots with etiolated bases which have the propensity to root well. Both procedures work well and produce cuttings which root at high rates. The significant difference between banding and the method of this invention is that in banding, a hand operation is required for each shoot to be etiolated, while in the method of this invention, the shoots are in effect self-etiolated, requiring no hand operations other than the original burying of the stock plant. And, as in trench layering, the whole operation must be repeated to produce new etiolated shoots in the banding technique.

U.S. Pat. No. 4,012,866 describes a technique which has been the standard of the industry for producing "clonal rootstocks" of avocados. It is performed by grafting a "scion" of the desired variety, the clonal rootstock, on top of a mother seedling. This grafted plant is fitted with a metal collar above the graft, and planted in the ground, with the ground level above the metal ring which slowly girdles the plant as it grows and expands. As in the case of air layering, the accumulation of carbohydrates and rooting hormones above the graft eventually induces the scion to produce roots. The mother plant either dies or is later cut off and discarded. The scion which is now rooted then becomes a clonal rootstock on top of which is grafted a scion of the variety desired to produce avocado fruit. This relates to the method of the present invention mainly in that it is another procedure which utilizes light exclusion to enhance rooting. But whereas the technique described in U.S. Pat. No. 4,012,866 produces only one clonal rooted plant from several hand labor operations, the method of this invention produces mainly rootable cuttings from the one act of burying the stock plant horizontally.

A method of tissue culturing of nut species (most of which are considered hard-to-root) that has produced viable plants is a technique where the culture vessel is painted black, to exclude light from its base and the culture medium is described by Rugina, E. A. et al, Scientis Horticulturae 53:63–72 (1993). Also, the surface of the culture medium is covered with black, light-blocking beads. These beads are sterilized before introduction into the interior of the vessel. The bases of the plants in the vessel are etiolated as they grow, and therefore are primed to be more rootable either in a root-promoting culture medium, or after being removed and treated with a rooting hormone, and being placed in a mist bench or fogged greenhouse.

Molnar et al, U.S. Pat. No. 4,569,914, discloses a method for the production of propagating material of plants by micropropagation which require that they begin with sterile shoot cuttings and not stock plants.

Hechinger, U.S. Pat. No. 3,012,372, discloses a method for the vegetative propagation of plants that is basically a modification of trench layering or stool bedding. Hechinger discloses only fruit trees as being rooted. Apples, pears, plums, cherries, and peaches, which are the species listed, have all been rooted by traditional methods, such as commercial stool beds, and so are not considered impossible or hard-to-root from cuttings such as all of the nut species.

Raines, U.S. Pat. No. 2,431,890, describes a humidifying/misting chamber of two sections where rooting and non-rooting portions can be treated differently. It mentions wrapping the bottom rooting portion in sphagnum moss, and providing stronger lighting for the top portion. But all of these shoots are treated vertically, and the operations are all done after the shoot (cutting) is taken.

Driver, U.S. Pat. No. 4,612,725, discloses a method for producing cuttings which root in place in the field. It mainly involves special enclosures with irrigation water piped to each enclosure. Also described is the work done in the tissue culture lab and the acclimation necessary in the greenhouse. This is a labor-intensive and time-consuming procedure which, even after all the work, does not produce a very good root system.

The Mlieva Orchards reference (S.U. Patent No. 1255-080-A) discloses a procedure for propagating apples, as pointed out above, a relatively easy to root species. In this process, the stock plant is placed in the soil in a curved position. One end of the stock plant is above the ground and the other end is inclined in the soil. This increases the amount of labor required to practice the method.

Bordovsky, Czech. Patent No. 76 678, discloses a method for the vegetative propagation of plants wherein a clonal stock plant is positioned in ground, etiolated shoots grown on the stock plant and rooted shoots are removed and planted. However, this method requires that the stock plant be placed in the ground at a slightly upward angle which increases the amount of labor required.

Mehra-Palta, U.S. Pat. No. 4,550,528, discloses a method wherein stock plants are used to produce shoots and the shoots removed and rooted in a mist bench. This procedure is referred to as hedging. In this method, stock plants are grown vertically rather than horizontally.

Raines, U.S. Pat. No. 2,431,890, discloses the use of a high moisture environment in the rooting of cuttings and Shimazu, U.S. Pat. No. 3,835,584, discloses the rooting of cuttings in a synthetic medium.

Pruitt, U.S. Pat. No. 2,988,441, Porte, U.S. Pat. No. 3,831,317, Schmitz et al, U.S. Pat. No. 2,816,825 and Nelson, U.S. Pat. No. 2,891,355, all disclose the use of synthetic root mediums for plant culture.

None of the prior art noted above or any other known to the inventor discloses or suggests the method of this invention.

SUMMARY OF THE INVENTION

Figure 1:
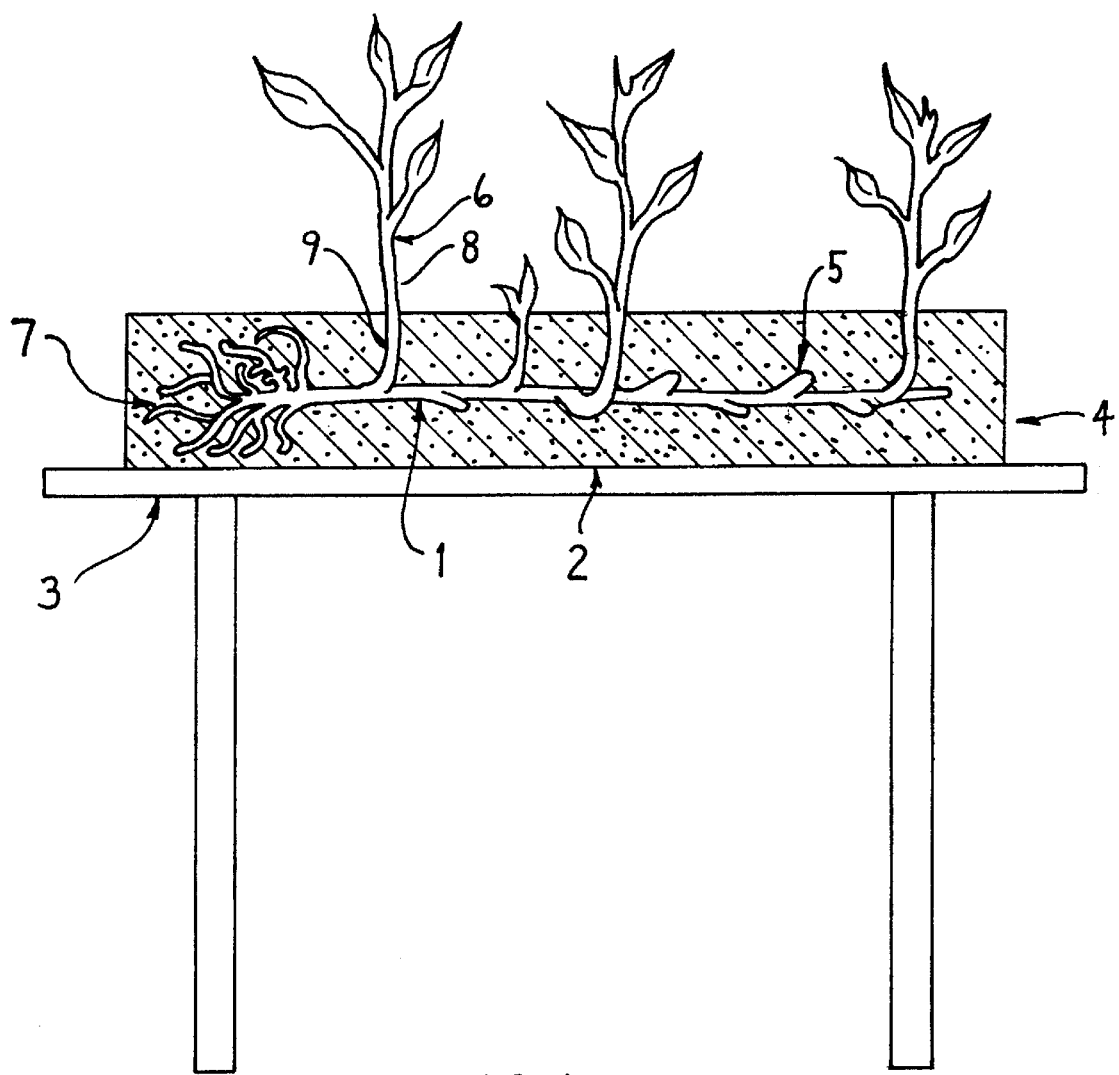
FIG. 1 illustrates growth of shoots on a stock plant in accordance with the method of this invention.

This invention relates to a method of vegetative plant propagation which comprises:

A particularly effective embodiment of the method of this invention is conducted in a greenhouse and comprises:

(a) inducing at least substantially dormant portions of a stock plant of a hard-to-root species of plant to produce etiolated shoots by embedding essentially the entirety of said stock plant in a substantially horizontal position within a growth medium within a container which contains a depth of at least 3-½ inches of growth medium, and maintaining said medium under cultural conditions of temperature and moisture which are optimum for rapid breaking of lateral buds and vegetative plant growth;

(b) allowing shoots to elongate to a predetermined height above the surface of said growth medium and to a stage of maturity which allows for the enhanced rooting of said shoots;

(c) cutting said shoots from said stock plant, before said shoots develop roots and before said shoots reach a semi-hardwood stage of development, with the cut being made at a location along said shoots between said soil surface and the axis of at least the main stem of said stock plant to generate softwood cuttings;

(d) placing at least the basal portion of each of said cuttings which developed beneath the surface of said growth medium into a rooting medium and maintaining said basal portion under cultural conditions of temperature and moisture content which have been optimized for the formation of roots while substantially preventing said cuttings from wilting;

(e) after maintaining said cuttings in said rooting medium for a time sufficient to allow for root formation to take place, removing the rooted cuttings from said rooting medium; and (f) planting said rooted cuttings into a soil medium and under conditions which will allow said rooted cuttings to develop into specimens which will survive field conditions without additional protection.

A particularly effective embodiment of the method of this invention is conducted in a greenhouse and comprises:

(a) placing a stock plant horizontally in a container located in a greenhouse;

(b) covering said stock plant with a soilless medium;

(c) allowing etiolated shoots to develop on said plant stock;

(d) removing said shoots after they have reached a semi-hardwood state and before they have rooted;

(e) treating the shoots with rooting hormone;

(f) placing the treated shoots in a mist bench and leaving therein until roots adequate for planting have developed;

(g) removing the rooted shoots from the mist bench and placing in a greenhouse or shadehouse to allow them to become hardened; and (h) planting the rooted shoots for growth into plants.

While the method is generally applicable to all plants reproducible by root cuttings, it is particularly useful for root cuttings of hard-to-root plants. The plants reproducible by the method of this invention include nuts, timber, ornamentals and fruits, including fruits grown in tropical, subtropical and temperate zones.

Also provided is a method for producing etiolated shoots and etiolated shoots prepared by said method.

Further provided is a method for using plastic foam cubes to root plants.

(1) In the first part of the claimed method, see FIG. 1, stock plants I produced by any method, such as grafting or layering of the desired variety, are placed horizontally in a bed or flat 2 that is resting on a bench 3 and is covered with a growing medium 4. When the buds 5 begin to sprout, the shoots 6 will grow vertically, and push up through the medium. The roots 7 of the stock plant supply the growing shoots with water and nutrients, and the tops growing above the medium supply the needed carbohydrates. The part of the shoot which breaks though the medium and grows into the light will become green and harden 8. The part which grew below the surface will stay white and soft in the absence of light, and is in effect self-etiolated 9. This etiolation causes the base of the shoots to be predisposed to rooting. The horizontal positioning and covering of the plant with a growth medium establishes a complex, self-sufficient system for producing many shoots which will be in the perfect physiological state to produce roots when they are cut and placed in a high moisture environment.

In a variation of the first step, relatively large diameter rootless stock plants of the desired variety rather than seedling trees, own-rooted trees or grafted trees are used. While seed stock used in this variation can have a mean diameter below ¾ of an inch and length that will fit in the container, it is preferred that its mean diameter be ¾-inch or above and its length at least 3 feet. In most species this variation is preferred because it is less costly. Examples of such species are chestnuts, hazel nuts, lemons, paw paw and walnuts.

(2) The second part of the claimed method involves utilizing the etiolated shoots produced in the first step. The shoots are cut off of the stock plants, treated with rooting hormone, and then rooted in a high moisture environment, such as a mist bench. As cuttings are taken off of the stock plants, more buds are stimulated to grow into harvestable shoots, increasing the number of rootable shoots. This also provides a way to easily treat the shoots with rooting hormone which increases the number of rooted shoots and the amount of roots on each shoot.

There are several important differences between the method of this invention and other conventional techniques which may also use softwood or semi-softwood cuttings. These advantages are:

Conventional techniques require that hand operations be performed for each shoot on the parent plant as in girdling, banding, and air-layering. In the method of this invention, individual hand operations are not needed as shoots are self-etiolated;

By producing many rooted shoots per grafted or air-layered tree rather than just one, the expense of grafting is spread over many plants, thus reducing the cost of each plant. Costs are further reduced by reusing stock plants in subsequent years, and by being able to utilize culled plants for stock plants rather than discarding them or waiting another year for them to grow to a saleable size;

The claimed method is performed in the greenhouse early in the year, so rooted cuttings are ready to plant in the field at the beginning of the growing season. This insures a full season to grow the plants to a saleable size. Conventional techniques using softwood or semi-softwood or semi-hardwood cuttings from field-grown plants get a much later start and the cuttings have less of the season left to grow, so the resultant plants are smaller;

Because shoots are removed from the stock plants as they arise, otherwise dormant buds will grow into useable shoots, increasing the number of shoots. Removal of shoots also makes them much easier to treat with rooting hormone than in techniques where they are left on the stock plants.

DETAILED DESCRIPTION OF THE INVENTION

Definitions

MEAN DIAMETER: The mean diameter of a stock plant is the sum of the plant's largest and smallest diameters divided by two.

BLANCHING: The growing of a stock plant in normal light and then placing it in the dark so that the shoots lose most of their chlorophyll and therefore their green coloring. This enhances the subsequent ability of the shoots to root, but is generally considered to be inferior to etiolation in this respect.

BOTTOM HEAT: Heat supplied underneath a greenhouse bench. Plants generally grow at a rate proportional to the temperature. Bottom heat keeps the plants or cuttings at a higher temperature, and helps them grow faster. This is particularly helpful in the rooting of cuttings.

CUTTING: A plant part, such as a shoot, which is cut from a plant. This is usually done to provide vegetative material for the propagation of new plants.

DEFOLIATION: The act of removing the foliage, or leaves, from a plant. This is done to stimulate dormant buds to begin growth.

DORMANCY: Not growing. Usually refers to a plant part or whole plant that has stopped growing in response to some environmental stress such as cold or dry conditions.

ETIOLATION: The absence of chlorophyll and other plant chemicals resulting in a white, yellow or light green coloration, and usually a swelled appearance. Plant parts grown in the absence of light become etiolated.

FLATS: Horticultural containers used for growing plants, germinating seed or root cuttings. They are always longer and wider than they are high, thus they appear to be flat.

GIRDLING: The act of cutting away a ring of plant tissue in a shallow groove, usually around a branch or the trunk. The part cut away consists of bark, cambium and phloem, and impedes the transfer of nutrients past the point of the girdle. This is usually done to trap carbohydrates above the point of the girdle either to enhance fruit production or to promote rooting.

GROWING MEDIUM: A medium for growing plants, i.e. soil, peat moss, etc.

MIST BENCH: A system for propagating plants, usually in a greenhouse, which supplies mist to keep plants hydrated, usually while they are in the act of root formation. The mist is usually operated by a timer or other automatic controlling device.

ROOTING HORMONE: A group of either natural or synthetic plant hormones which promote rooting in plants under the proper conditions can be used. These include such natural chemicals as IAA (Indole Acetic Acid), and such synthetic chemicals as IBA (Indole Butyric Acid), and NAA (Naphthalene Acetic Acid).

ROOTSTOCK: The lower part of a grafted tree which is spliced onto and made to grow together with a scion, which is the top part of a grafted plant. Usually the rootstock is selected for its superior abilities to grow in adverse soil conditions such as salinity and the presence of diseases, or top induce dwarfing.

SCION: The upper part of a grafted tree which is spliced onto and made to grow together with a rootstock, which is the bottom part of a grafted plant. Usually the scion is selected for superior fruiting or flowering capabilities.

SHADEHOUSE: A horticultural structure which reduces the intensity of light beneath it used to shade plants. This enables the plants to successfully make the transition from warmer and more moist conditions in a greenhouse to field conditions which are usually drier and more variable in temperatures.

SOILLESS MEDIUM: A medium used by horticulturalists as a substitute for soil for growing plants. It is "soilless" as it contains no true soil, but is superior to soil for growing plants in pots because in combination with the pot it approximates natural growing conditions better than would actual soil in a pot. These mediums may be composed of milled, screened sphagnum peat moss for water retention and an agent to aerate the peat such as peralite, vermiculite, styrofoam or rock wool.

STOCK PLANT: A plant which is grown in order to provide cuttings which are taken from it for the purposes of vegetative (rather than by seed) reproduction. It may have roots or be rootless.

Facilities

GREENHOUSE: While the method of this invention can be conducted indoors or outdoors under mild conditions, it is preferably performed in a greenhouse usually during the late winter months. The greenhouse should have a source of heat that can be regulated; a means of air circulation; the capacity for ventilation; and a source of water, adjusted for alkalinity where necessary. Supplemental lighting may be beneficial in areas of low winter light intensity, but is not required.

Two different types of environments are needed within the greenhouse. One is an area set up for growing the stock plants. This area is also used for hardening the cuttings after they are rooted unless a shadehouse is available. The stock plant area should have benches that are made into beds, and/or which are suitable for holding flats. Generally 500 square feet of this type of bench space is needed for each 10,000 trees being produced, but up to 1,000 square feet may be needed for some types of plants. The beds or flats should be at least 3-½ inches deep.

The other area needed in the greenhouse is a high moisture environment for rooting the cuttings. A high moisture environment as used herein means an environment wherein the moisture is maintained at a level that keeps the shoots from wilting. While there are various means known in the art for providing such an environment, a mist bench is a preferred means for use in the method of invention described and claimed herein. The mist bench should be set up to supply bottom heat and overhead fog or mist. About 500 square feet of mist bench is needed per 10,000 trees being produced which takes into account several sets of cuttings being rooted over time.

SHADEHOUSE: It is best to place the cuttings in a shadehouse after rooting. Here they can become acclimated to the drier conditions before transferring them to field conditions.

Materials

STOCK PLANTS: Stock plants to be used should not be taller than the width of the beds or the length of the flats being used, or they must be trimmed to fit. Or conversely, the beds and/or flats can be made so as to accommodate the height of the stock plants to be used. The stock plants can be (1) seedling trees of the desired type, (2) own-rooted trees of the desired variety produced using the claimed method or some other method such as air-layering, (3) grafted trees with scions of the desired variety or (4) rootless. When rootless stock plants are used it is preferred that they have a mean diameter of at least ¾ of an inch and a length of at least 3 feet. Approximately 2,000 stock plants are needed for every 10,000 trees to be produced from rooted cuttings. This varies, and is dependent on how many viable buds there are per stock plant. The more viable buds there are per stock plant, the fewer stock plants will be needed. It also depends on the success rate of rooting the cuttings. See Table 1 on page 18.

Smaller "cull" plants which do not meet quality control standards for sale and would have been discarded or at least would have needed another year to grow to a saleable size, are fine to use as stock plants. Actually, they are preferable to larger ones because they take up less space in the beds or flats. So rather than being a waste product or something requiring a further cost input, the culls become a valuable resource as a raw material to produce new plants. This is an intangible, but real cost savings.

MEDIA: The particular medium to be used in beds or flats for planting stock plants should be well drained. Any medium which contains proportions of approximately one to three parts sphagnum peat moss to one part aerator, such as peralite or Styrofoam, will work well. The medium used in the mist bench should be more well drained, on the order of one part peat moss to two parts perlite, or some comparable medium. The medium should have the capacity for aeration/drainage. Too little aeration/drainage capacity in the stock plant beds will cause the newly growing shoots to rot, and in the mist bench will cause the bases of the etiolated shoots to rot.

Also, the cuttings can originally be "placed" in a small block of a synthetic foam. The roots which develop will penetrate this material, and be provided with a reservoir of water during the critical transition period immediately after exiting the mist bench.

Studies show a significant increase in the ultimate diameters of "Paradox" walnut cuttings that were propagated in Oasis foam. Cubes approximately 2.5 inches on all sides were used.

CHEMICALS/HORMONES: It is important to use a rooting hormone to treat the bases of all cuttings in order that they may have the best chance of successful rooting. If no rooting hormone is used, the percentage of rooted cuttings may well be zero in some types of plants. Talc-based powder and alcohol-based liquid rooting hormones are among those usable in the claimed method. Although it is expected that rooting hormones will be used to insure the highest levels of rooting possible, no particular rooting compounds are required for this procedure.

CHILL REQUIREMENT: Overcoming dormancy in the stock plant is a necessity before using them. This can be accomplished naturally in the field, or under controlled conditions such as a cold room. If a cold room is used, the stock plants are placed in the cold room, and removed when their chill requirement has been met. They are then placed in warmer conditions, and their buds are observed for signs of swell. Likewise, field-grown stock plants are either observed in situ or dug after the chill requirement is met, and brought inside where they are observed for signs of bud swell. When the buds have begun to swell, the stock plants are ready to be placed in the greenhouse in flats or beds. In the case of trees which retain their leaves throughout the year, it is probably best to strip the leaves off the stock plants before burying them.

The chill requirement will depend upon the stock plant and can be determined by methods known to those skilled in the art. Typically, the temperature will be just above the freezing point of water, at about 3° C.

PRE-CONDITIONING: The reason that this method is able to root difficult to root cuttings so well is due to its pre-conditioning or etiolation of the shoot bases. This insures that they will be in the correct physiological state to be ready to root when they are cut and placed in the mist bench.

To accomplish the pre-conditioning, a deep flat or bed 3-½ inches deep is prepared by filling it to a depth of ¾ to 1 inch deep with growing medium. Stock plants whose dormancy has been broken are then laid down in a horizontal position on top of the medium. The roots are covered with medium and if the buds have begun to burst, the tops of the plants are also covered at this point with more medium to nearly fill the flat or bed. Otherwise, wait until the buds begin to burst and then cover the tops of the stock plants with medium.

For plants such as pecans and paw paws, a variation of the pre-conditioning technique improves results. The stock plants are laid down on top of the thin layer of medium and the roots are well covered with growing medium just as is described above. But the new shoots are not covered with medium until they grow out to a length of one to two inches. If this initial exposure is not provided, the shoots of these plants will either not grow sufficiently to reach the surface of the medium as in the case of pecans, or they may rot and die as happens with paw paws.

After the stock plants have been laid down in the beds or flats, it takes 2 to 4 weeks before shoots will begin to break the surface of the medium, depending on the temperature. Generally, the warmer the temperature, the more quickly this will happen (up to about 90° F.). To insure proper growth, the plants must also be exposed to light sufficient to insure good growth of the new shoots; be supplied with water; and be lightly fertilized with a fertilizer appropriate to the type and the variety of plant and appropriate to a greenhouse setting. Do not over water the stock plant beds. Too much water will cause the newly growing shoots to rot and die. If in doubt, water the root end of the beds and not the end with the tops.

After the shoots have broken through the surface of the medium, it will take about 1 to about 4 more weeks before cuttings can be taken. As cuttings are taken, more buds on the buried stock plants are stimulated to grow, and so more shoots will appear over time. To maximize the number of cuttings per stock plant, it is therefore necessary to take cuttings over a period of time until new shoots stop appearing or appear at too slow a rate. This can take two months or more. The larger the percentage of buds which originally break into growth, the fewer will grow subsequently, and so the shorter the period of taking cuttings will be. The use of bottom heat can be used to speed up production.

SHOOT SEGREGATION: If grafted trees are used as stock plants rather than layered or own-rooted trees, care must be taken to avoid mixing up the shoots arising from the rootstock with the shoots arising from the scions, which would be of different varieties. It is suggested that either 1) the stock plants be aligned in such a way that a physical barrier when erected (such as a board placed edge up in the medium), will actually separate the two kinds of shoots, or 2) a tag or mark of some kind be affixed to each tree at the point where the scion and rootstock are joined so that the two kinds of shoots can be visually differentiated at the time the cuttings are taken. Another way to differentiate the two types of shoots is to use a rootstock which produces shoots of a different color, leaves of a different shape, etc.

HARVESTING CUTTINGS: Shoots are not ready to cut until they have reached a semi-hardwood state. This is apparent when they become less pliant and more firm for an inch or two above the surface of the medium. In some plants such as chestnuts, the surface of the shoot below the medium may also turn a slightly darker color at this point. These changes mark the transition from a softwood to semi-hardwood, indicating the shoots are ready to harvest.

The best tool to use for taking the cuttings is the kind of clipper used for trimming bonsai that cuts at an angle of about 60° to the handles, and has a curved cutting edge about one inch long. Using the fingers or a suitably delicate tool, pull the soil away from the base of the shoot which is to be cut. Then hold the clipper handles vertically, working the cutting edges around the shoot base. Make the cut a short distance away from the stock plant, leaving a small piece of the shoot attached. Using this tool and procedure will provide a clean cut close to the stock plant, without injuring any tender shoots which may not be ready for harvest or even readily discernable. After the cuttings are taken, they should be treated with rooting hormone and placed in the mist bench as soon as possible.

Some of the more easily rooted plants such as butternuts may develop roots on the shoots before they are taken off of the stock plants as cuttings. These shoots would not need to be treated with hormones but may need to be placed in the mist bench for further root growth. If well rooted, they can be potted and can go directly to whatever facility is being used for hardening.

ROOT INITIATION AND GROWTH: After the cuttings have been taken, they are placed in a high moisture environment with their bases inserted about one and one-half inches into a very well aerated medium. The amount of time for root initiation to occur varies a great deal between plant genera. TABLE 2 on page 19 lists the ranges of times for root initiation for some species. Usually the cuttings should be removed from the mist as soon as adequate roots have developed, which may take a few weeks after root initiation. It is best to periodically evaluate the cuttings and remove the ones which are rooted well, returning the rest to the mist bench for rooting or further root growth.

Figure 2:
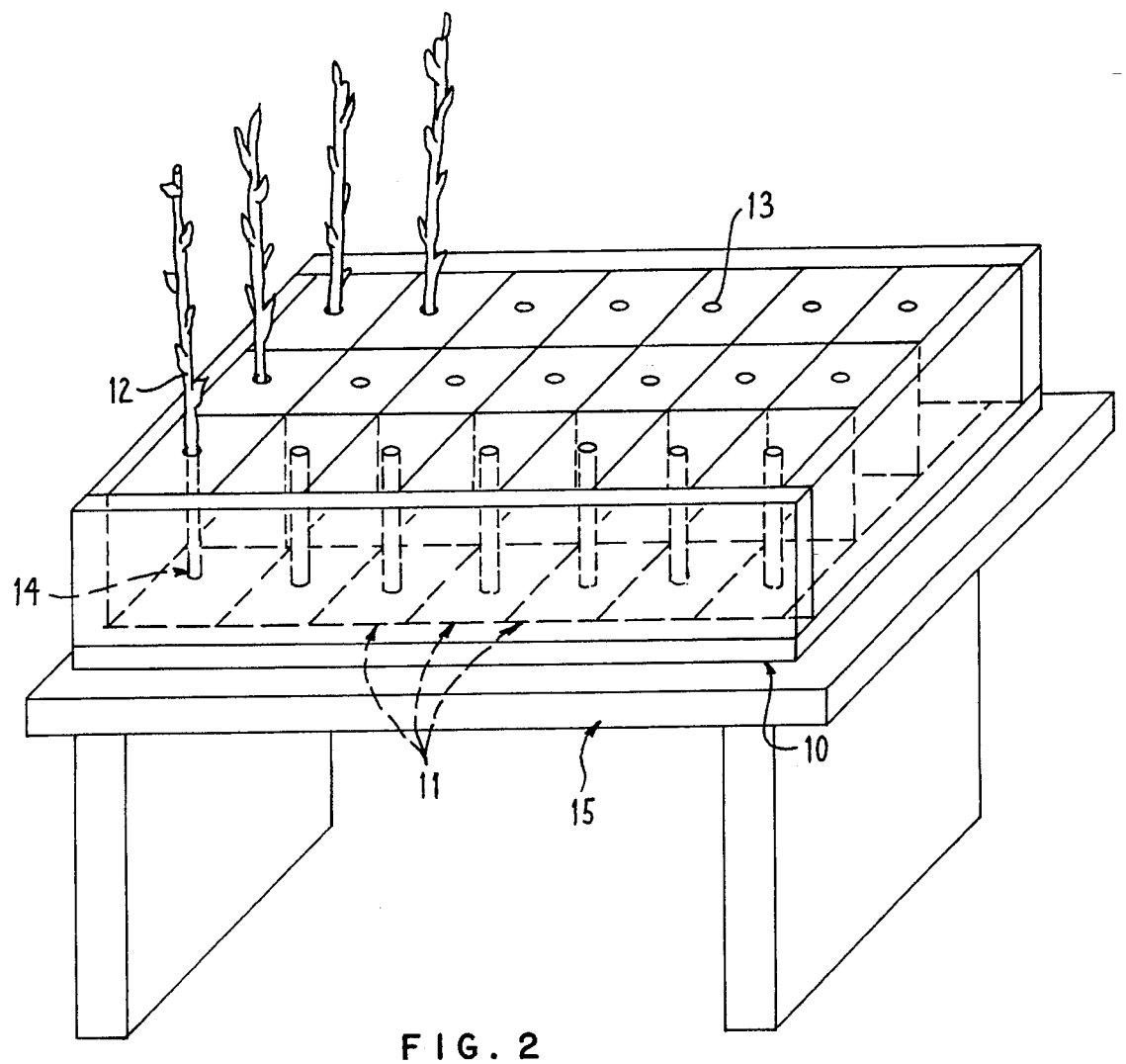
FIG. 2 illustrates shoots that have been placed in a mist bench for rooting.

A particularly effective method of rooting the cuttings is illustrated in FIG. 2. The cuttings are placed into a flat 10 in cubes 11 made of a semi-rigid polymeric plastic foam. Such foams are well known in the art and are commercially available. In a preferred embodiment of the method of this invention, cubes (about 2.5" sides) of the semi-rigid, pheno-formaldehyde polymeric plastic foam known as OASIS, are arranged to fill a three inch deep flat. Plant cuttings 12 are stuck vertically into the center 13 of each block, so that the cuttings are more-or-less equidistant from each other. The cuttings should be near to 14, but not penetrating all the way to the bottoms of the cubes. The flat containing the cubes of foam and cuttings is placed in a mist bench 15 so that water is periodically sprayed over the entire flat and its contents. The sizes of foam blocks and flats used will depend on the size of the cuttings being propagated.

When the cuttings form roots, the roots grow through the foam which supplies mechanical support for the roots, and also moisture for their growth. When the roots begin to show on the outside of the cubes, the cuttings can be removed from the mist bench. Only then are the full benefits of using this foam realized.

One of the most critical points in propagating cuttings is the transition from the moist environment of the mist bench to the drier, normal environment. If the cuttings had been rooted in a soilless medium, they would have to have been dug up and replanted, thus disturbing the roots. The Oasis keeps the roots from being disturbed, and also supplies them with moisture during this critical stage, and so the newly rooted cuttings recover from the shock of exiting the mist bench much more quickly.

Use of the foam increases the number of rooted hazel cuttings that survived and also increases the resultant diameter of the cuttings by the end of the growing season.

After the rooted cuttings are removed from the mist bench, they should be given time in the greenhouse or in a shadehouse to become hardened to the drier conditions. They may then be moved to the field where they are to be grown to a saleable size.

If cuttings of a particular species root at a high level, cuttings can be rooted in the container in which the rooted cutting will be sold. In this situation the cuttings would not be removed from the mist bench medium singly, but rather would be removed together as a unit. However, if the initial rooting level is too low, this batching of cuttings could reduce the ultimate number of cuttings rooted.

TABLE 1

Root Growth

| Common Name | Genus | # Days for Root Initiation | Percentage of Rooting Success |
| --- | --- | --- | --- |
| Chestnut | Castenea | 15–30 | 60 |
| Hazel | Corylus | 12–24 | 75 |
| Paw Paw | Asimina | 20–40 | 60 |
| Pecan | Carya | 15–30 | 67 |
| Walnut | Juglans | 20–40 | 75 |

TABLE 2

Harvesting Shoots

| Common Name | Genus | # Days to First Shoot Harvest | # Months to Harvest All Shoots |
| --- | --- | --- | --- |
| Chestnut | Castenea | 30 | 3.5 |
| Hazel | Corylus | 20 | 2.0 |
| Paw Paw | Asimina | 60 | 3.0 |
| Pecan | Carya | 30 | 2.0 |
| walnut | Juglans | 20 | 3.5 |

Values will vary depending on the species, the variety, and on the production conditions.

Other species rooted utilizing the method of this invention are set forth in Table 3 below.

TABLE 3

| Type | Variety | Species |
| --- | --- | --- |
| 1. Apple | "Ida Red" | Malus sylvestris |
| 2. Beech, American | Seedlings | Fagus grandifolia |
| 3. Birch, White | Seedlings | Betula paprifera |
| 4. Butternut | Seedlings | Juglans cinerea |
| 5. Carambola | Seedling | Averrhoa carambola |
| 6. Cherry, Sour | "Montmorency" | Prunus cerasus |
| 7. Cherry, Sweet | "Lapins" and "Mazzard" | Prunus avium |
| 8. Chestnut, American | Seedlings | Castenea dentata |
| 9. Chestnut, Chinese | USDA P.I. 58602 | Castenea mollisima |
| 10. Chestnut, European | "Silverleaf" | Castenea sativa |
| 11. Chestnut, hybrids | "Sleeping Giant" "Willamette" | (various species) |
| 12. Citrus rootstock | "Flying Dragon" | Poncirus trifoliata |
| 13. Durian | Seedlings | Durio zibethinus |
| 14. Grapefruit | "Cocktail" | Citrus paradisis |
| 15. Guava | Seedlings | Psidium guajava |
| 16. Hazelnut, American | "Graham" | Corylus americana |
| 17. Hazelnut, European | "Hall's Giant" | Corylus avellana |
| 18. Hazelnut, hybrid | Seedling | Corylus colurna X avellana |
| 19. Jujube | Seedling | Ziziphus jujuba |
| 20. Lemon | "Meyer" | Citrus limon |
| 21. Longan | Several seedlings | Euphoria longana |
| 22. Mango | Seedlings | Mangifera indica |
| 23. Maple, Japanese | Red Dwarf | Acer palmatum |
| 24. Nectarine | "Merricrest" | Prunus persica X americana |
| 25. Paw Paw | "Taylor", "Overlease" | Asimina triloba |
| 26. Peach | "Red Haven" | Prunus persica |
| 27. Pear, Asian | "Singo" | Prunus pyrifolia |
| 28. Pear, European | "Harrow Delight" | Pyrus communis |
| 29. Pecan | "Pawnee" | Carya illinoensis |
| 30. Persimmon, American | Morris Burton | Diospyros virginiana |
| 31. Plum, Asian | "Shiro" | Prunus salicina |
| 32. Rambutan | Seedlings | Nephelium lappaceum |
| 33. Walnut, black | Seedlings | Juglans nigra |
| 34. Walnut, Persian | "Manregian" | Juglans regia |
| 35. Walnut, hybrid | "Paradox" | Juglans regia X hindsii |
| 36. White Sapote | Seedlings | Casimiroa edulis |
| 37. Walnut, Northern California Black | Seedling | Juglans hindsii |

What is claimed is:

1. An enhanced in vivo vegetative propagation method, which can be accomplished year around, to minimize the time required to multiply large numbers of hard-to-root plants while allowing for an enhanced proportion of rooting of true-to-type cuttings taken to take place, comprising the steps of:

(a) inducing at least substantially dormant portions of a stock plant of a hard-to-root species of plant to produce etiolated shoots by embedding essentially the entirety of said stock plant in a substantially horizontal position within a root medium within a container which contains a depth of at least 3-½ inches of growth medium, and maintaining said medium under cultural conditions of temperature and moisture which are optimum for rapid breaking of lateral buds and vegetative plant growth;

(b) allowing shoots to elongate to a predetermined height above the surface of said growth medium and to a stage of maturity which allows for the enhanced rooting of said shoots;

(c) cutting said shoots from said stock plant, before said shoots develop roots and before said shoots reach a semi-hardwood stage of development, with the cut being made at a location along said shoots between said soil surface and the axis of at least the main stem of said stock plant to generate softwood cuttings;

(d) placing at least the basal portion of each of said cuttings which developed beneath the surface of said growth medium into a rooting medium and maintaining said basal portion under cultural conditions of temperature and moisture content which have been optimized for the formation of roots while substantially preventing said cuttings from wilting;

(e) after maintaining said cuttings in said rooting medium for a time sufficient to allow for root formation to take place, removing the rooted cuttings from said rooting medium; and (f) planting said rooted cuttings into a soil medium and under conditions which will allow said rooted cuttings to develop into specimens which will survive field conditions without additional protection.

2. A method according to claim 1, which is conducted in a greenhouse and wherein step (a) is conducted in a soilless medium, the shoots obtained in step (c) are treated with rooting hormone and step (d) is conducted in a mist bench.

3. A method according to claim 2, wherein the stock plant has roots.

4. A method according to claim 3, wherein the stock plant is selected form the group consisting of nuts, fruit, timber and ornamental plants.

5. A method according to claim 4, wherein the stock plant is a nut stock plant.

6. A method according to claim 4, wherein the stock plant is a fruit stock plant.

7. A method according to claim 4, wherein the stock plant is a timber stock plant.

8. A method according to claim 4, wherein the stock plant is an ornamental stock plant.

9. A method according to claim 2, wherein the stock plant is rootless.

10. A method according to claim 9, wherein the stock plant has a mean diameter of at least ¾ of an inch and a mean length of at least 3 feet.

11. A method according to claim 10, wherein the stock plant is selected form the group consisting of nuts, fruit, timber and ornamental plants.

12. A method according to claim 11, wherein the stock plant is a nut stock plant.

13. A method according to claim 11, wherein the stock plant is a fruit stock plant.

14. A method according to claim 11, wherein the stock plant is a timber stock plant.

15. A method according to claim 11, wherein the stock plant is an ornamental stock plant.

16. The method of claim 2 wherein step (f) is conducted by placing the treated shoot vertically in cubes made of semi-rigid, polymeric plastic foam and placing the cubes in the mist bench.

17. A method according to claim 2, wherein bottom heat is applied to the container.

* * * * *